(12) United States Patent
Berglund et al.

(10) Patent No.: US 11,045,016 B2
(45) Date of Patent: Jun. 29, 2021

(54) BEARING PUSHER ASSEMBLY, AND PRODUCT DISPLAY INCLUDING A BEARING PUSHER ASSEMBLY

(71) Applicant: Process Retail Group, Inc., New Berlin, WI (US)

(72) Inventors: Terrence G. Berglund, Hales Corners, WI (US); James Ihrcke, West Allis, WI (US); Chris Harrell, Wauwatosa, WI (US)

(73) Assignee: Process Retail Group, Inc., New Berlin, WI (US)

( * ) Notice: Subject to any disclaimer, the term of this patent is extended or adjusted under 35 U.S.C. 154(b) by 0 days.

(21) Appl. No.: 16/227,040

(22) Filed: Dec. 20, 2018

(65) Prior Publication Data
US 2020/0196775 A1 Jun. 25, 2020

(51) Int. Cl.
*A47F 1/12* (2006.01)
*F16F 1/12* (2006.01)
*B60B 33/00* (2006.01)
*F16F 1/10* (2006.01)

(52) U.S. Cl.
CPC .......... *A47F 1/126* (2013.01); *B60B 33/0028* (2013.01); *F16F 1/122* (2013.01); *F16F 1/10* (2013.01)

(58) Field of Classification Search
CPC .......... A47F 1/126; A47F 5/0025; A47F 7/28; A47F 1/04; A47F 1/06; A47F 1/08; A47F 1/087; A47F 1/12; A47F 1/125; A47F 5/005; A47F 7/17; F16F 1/10; B60B 33/0028; B60B 33/0036; B60B 33/0039; B60B 33/0042; B60B 33/0044; B60B 33/0049

See application file for complete search history.

(56) References Cited

U.S. PATENT DOCUMENTS

| | | | | | |
|---|---|---|---|---|---|
| 2,742,663 | A | * | 4/1956 | Meadows | B60B 33/0063 16/40 |
| 3,589,632 | A | * | 6/1971 | Rew | B21C 47/003 436/509 |
| 4,049,308 | A | * | 9/1977 | Martin | B60B 33/0028 295/8 |
| 4,200,201 | A | * | 4/1980 | Collins | G07F 11/38 221/129 |
| 4,467,924 | A | * | 8/1984 | Morcheles | A47B 53/02 104/287 |
| 5,002,163 | A | * | 3/1991 | Kidd | B60B 33/021 16/35 R |

(Continued)

*Primary Examiner* — Ko H Chan
(74) *Attorney, Agent, or Firm* — DeWitt LLP; Christopher M. Scherer

(57) ABSTRACT

A bearing pusher assembly for moving product in a channel of a product display apparatus. The product display apparatus can have a tray component and a spring, the bearing pusher assembly to be coupled with the spring and moveable with respect to the tray component. The spring provides a resilience force to the tray component and the bearing pusher assembly upon deformation. The bearing pusher assembly includes a pusher body, an axle coupled to the pusher body, and a ball bearing coupled to the axle and rotatably moveable with respect to the tray component. Also disclosed is a product display apparatus including the bearing pusher assembly.

19 Claims, 12 Drawing Sheets

(56) References Cited

U.S. PATENT DOCUMENTS

| | | | | |
|---|---|---|---|---|
| 5,111,942 A * | 5/1992 | Bernardin | A47F 1/126 | 211/59.3 |
| 5,570,811 A * | 11/1996 | Wittern, Jr. | G07F 11/42 | 221/127 |
| 6,142,317 A * | 11/2000 | Merl | A47F 1/125 | 211/184 |
| 6,253,954 B1 * | 7/2001 | Yasaka | G07F 11/42 | 221/131 |
| 6,425,587 B1 * | 7/2002 | Moon | A63C 17/004 | 280/11.206 |
| 6,464,089 B1 * | 10/2002 | Rankin, VI | A47F 1/126 | 211/59.3 |
| 7,347,335 B2 * | 3/2008 | Rankin, VI | A47F 1/126 | 211/59.3 |
| 7,464,797 B2 * | 12/2008 | Kidd | B60B 33/0021 | 188/1.12 |
| 8,016,128 B2 * | 9/2011 | Valiulis | A47F 1/126 | 211/59.3 |
| 8,190,289 B2 * | 5/2012 | Lockwood | A47F 1/126 | 221/15 |
| 8,234,752 B2 * | 8/2012 | Anderson | B60R 11/0235 | 16/239 |
| 8,353,425 B2 * | 1/2013 | Lockwood | A47F 1/126 | 221/227 |
| 8,413,826 B2 * | 4/2013 | Schneider | A47F 1/126 | 211/184 |
| 8,863,355 B1 * | 10/2014 | Lee | B60B 33/0047 | 16/46 |
| 9,173,504 B2 * | 11/2015 | Hardy | A47F 1/126 | |
| 10,154,739 B2 * | 12/2018 | Turner | A47F 1/125 | |
| 2002/0148794 A1 * | 10/2002 | Marihugh | A47F 1/126 | 211/59.3 |
| 2006/0163272 A1 * | 7/2006 | Gamble | A47F 1/126 | 221/227 |
| 2007/0267367 A1 * | 11/2007 | Mueller | A47F 1/126 | 211/59.3 |
| 2015/0157142 A1 * | 6/2015 | Turner | A47F 1/125 | 211/59.3 |

\* cited by examiner

BEARING PUSHER ASSEMBLY, AND PRODUCT DISPLAY INCLUDING A BEARING PUSHER ASSEMBLY

BACKGROUND OF THE INVENTION

1. Field of the Invention

The present invention relates generally to bearing pusher assemblies for moving an object. In particular, the present invention relates to bearing pusher assemblies that can be used in, for example, a product display apparatus, and can be used for moving, for example, a product in a channel of the product display apparatus.

2. Discussion of the Related Art

Spring propelled pusher display apparatuses improve the presentation of consumer products at retail. The pusher apparatus has many benefits to retailers, product manufacturers, and consumers. Such benefits include improved product presentation, reduced retail labor by eliminating most detailing labor and stocking labor, and improved organization of the products at retail.

In known prior displays, the spring-loaded pusher pushes products to the front of the shelf or display to keep it visible to the consumer's eye. The largest complaint about pusher apparatus is that the pusher component declines in performance over time. This decline in performance leads to poorly displayed product, product damage, and eventually breakage of the display. The longevity of a pusher apparatus relies on the quality of the pusher design, and the manufacturing materials used to keep the pusher operating in its optimal state.

SUMMARY AND OBJECTS OF THE INVENTION

By way of summary, the present invention is directed to a pusher assembly with the use of a ball bearing. A pusher assembly having a ball bearing reduces the friction between the moving parts and the fixed parts. The ball bearing greatly reduces the wear that would normally occur between a standard pusher with no ball bearings and a standard tray.

In at least some embodiments, the bearing can be a sealed bearing type so that its internal moving parts are shielded from contaminants such as dust, debris, liquids, or other soils that inhabit a store shelf or refrigerated area. The sealed bearing allows the pusher to move freely even after cleaning with soap and water, which cannot be said for known pushers in the marketplace.

In one embodiment of the invention, a bearing pusher assembly for moving product in a channel of a product display apparatus is disclosed. The product display apparatus has a tray component, and a spring. The bearing pusher assembly is to be coupled with the spring and moveable with respect to the tray component. The spring provides a resilience force to the tray component and the bearing pusher assembly upon deformation. The bearing pusher assembly includes a pusher body, an axle coupled to the pusher body, and a ball bearing. The ball bearing is coupled to the axle and is rotatably moveable with respect to the tray component.

In another embodiment of the invention, a product display apparatus is disclosed. The product display apparatus includes a tray component including a base section, a first wall section, and a second wall section. The product display apparatus further includes a bearing pusher assembly moveable with respect to the base section. The bearing pusher assembly, the base section, the first wall section, and the second wall section define a product channel. The bearing pusher assembly includes a pusher body, an axle coupled to the pusher body, and a ball bearing coupled to the axle and rotatably moveably coupled to the tray component. The product display apparatus also includes a spring coupling the tray component and the bearing pusher assembly. The spring provides a resilience force to the tray component and the bearing pusher assembly upon deformation.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and of the construction and operation of typical embodiments of the present invention, will become more readily apparent by referring to the exemplary, and, therefore, non-limiting, embodiments illustrated in the drawings accompanying and forming a part of this specification, wherein like reference numerals designate the same elements in the several views, and in which.

Figure 1:
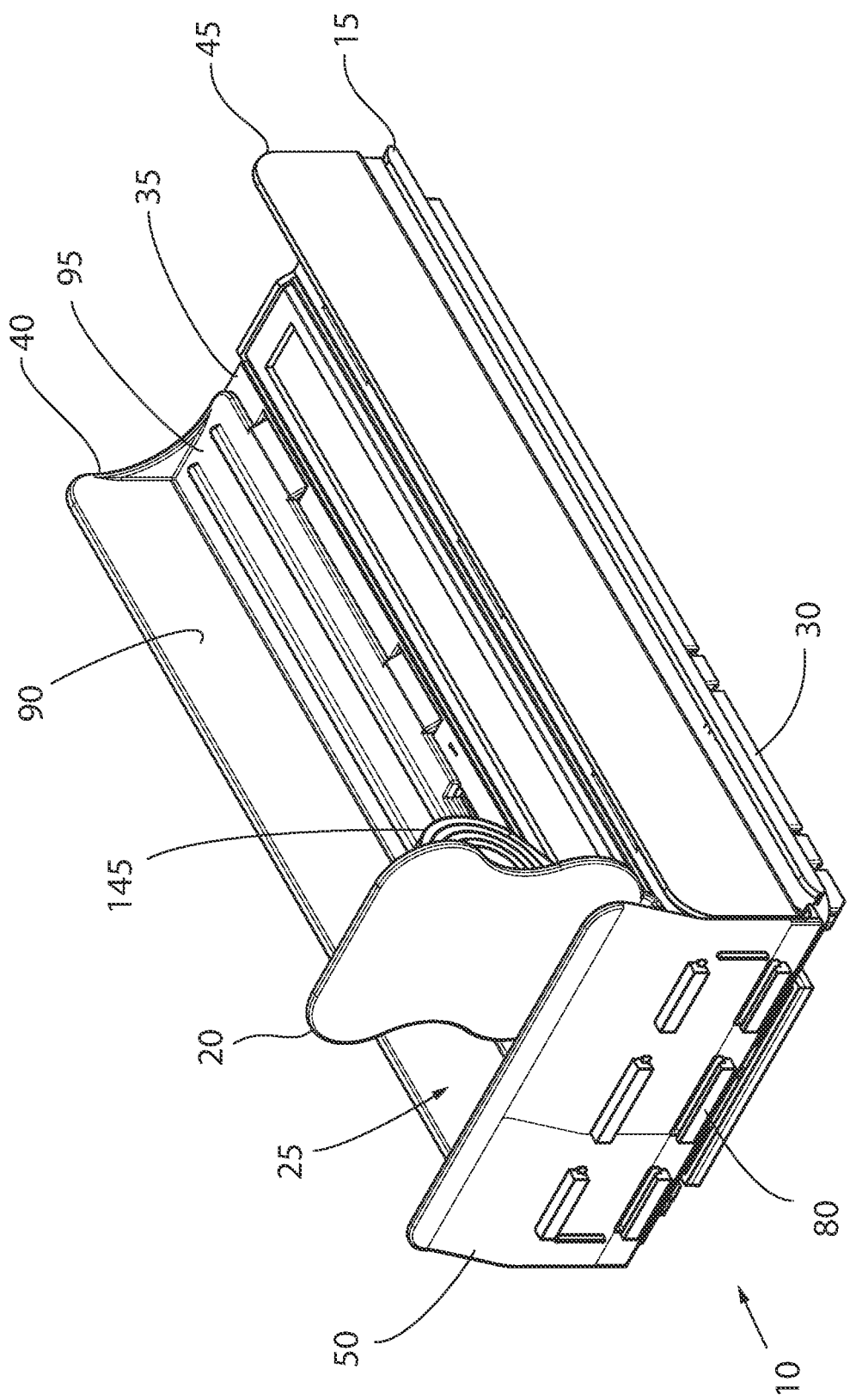
FIG. 1 is an isometric view of a product pusher apparatus according to one embodiment of the invention.

In describing preferred embodiments of the invention, which are illustrated in the drawings, specific terminology will be resorted to for the sake of clarity. However, it is not intended that the invention be limited to the specific terms so selected and it is to be understood that each specific term includes all technical equivalents, which operate in a similar manner to accomplish a similar purpose.

DETAILED DESCRIPTION OF THE DRAWINGS

The present invention and the various features and advantageous details thereof are explained more fully with reference to the non-limiting embodiments described in detail in the following description.

Figure 2:
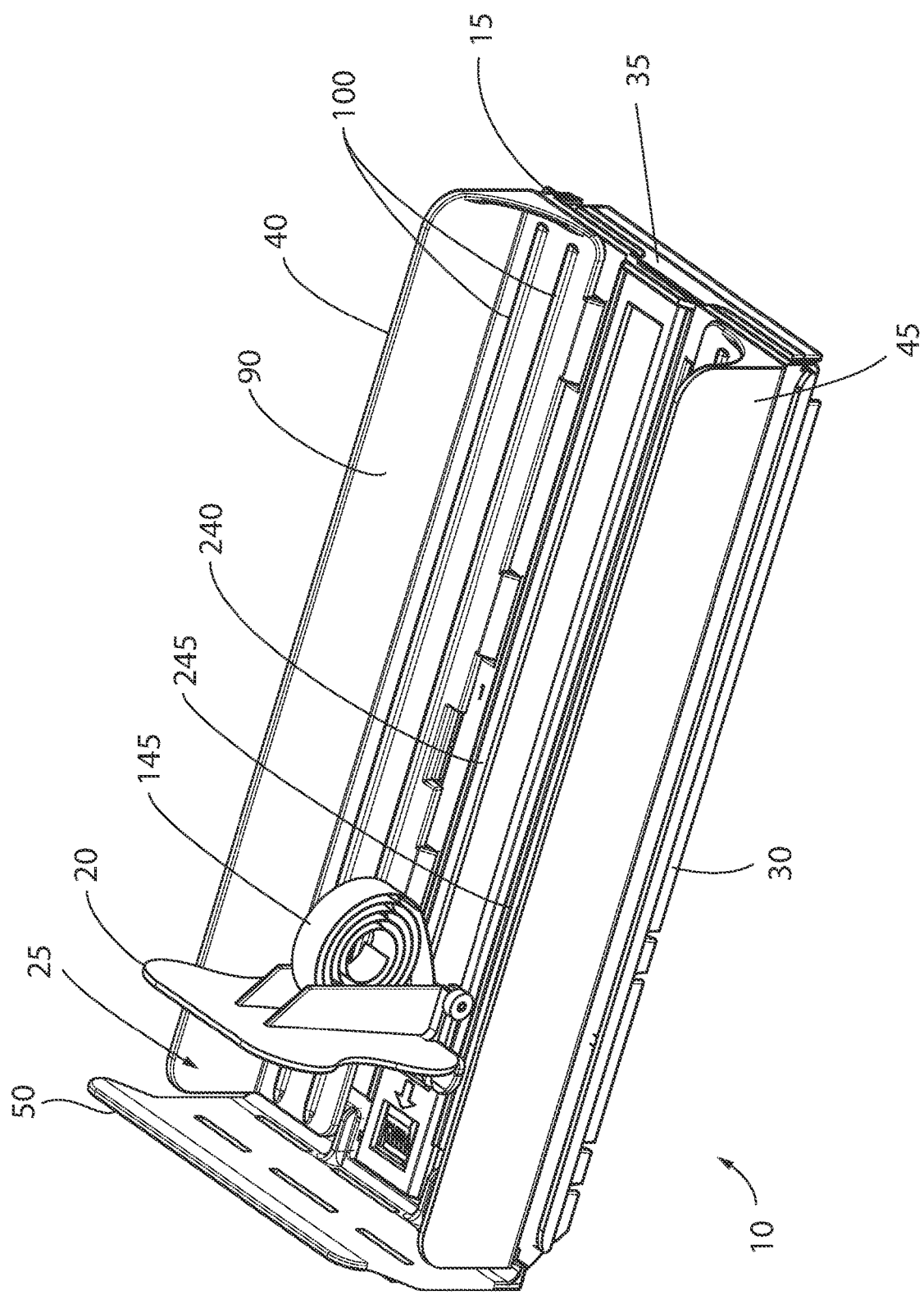
FIG. 2 is a reverse isometric view of the product pusher apparatus of FIG. 1.
Figure 3:
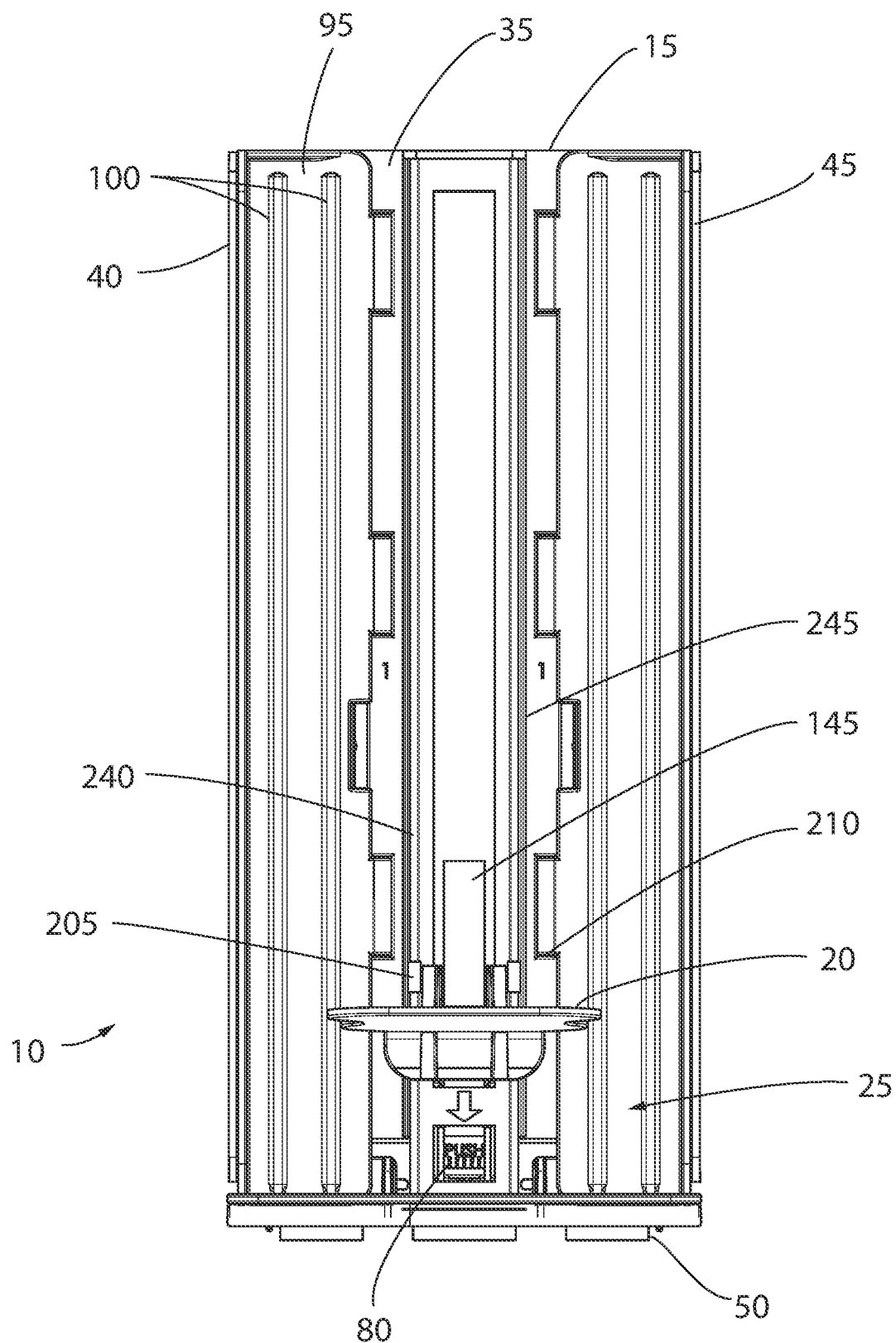
FIG. 3 is a top view of the product pusher apparatus of FIG. 1.

FIGS. 1-3 illustrate one construction of a product display apparatus 10. The product display apparatus 10 can be used in a variety of product display settings, including retail products displays. Generally, the product display apparatus 10 includes a tray component 15 and a bearing pusher assembly 20. The tray component 15 and the bearing pusher assembly 20 define a product channel 25. As will be discussed in more detail below, product (not shown) is placed within the channel 25 and the bearing pusher assembly 20 applies a force, or pushes, the product against the tray component 15. For the construction shown, the tray component 15 is horizontally slideable with respect to a base component 30, as will be discussed further below.

The tray component 15 includes a base section 35, a first wall section 40, a second wall section 45, and a front stop 50, all of which can be distinct sections, be molded to form a unitary tray component 15, or a combination thereof. In some constructions, one of the first and second wall sections 40 or 45 is not present. For the shown construction, the base section 35, the wall sections 40 and 45, and the front stop 50 are distinct sections coupled together to form the tray component 15.

Figure 4:
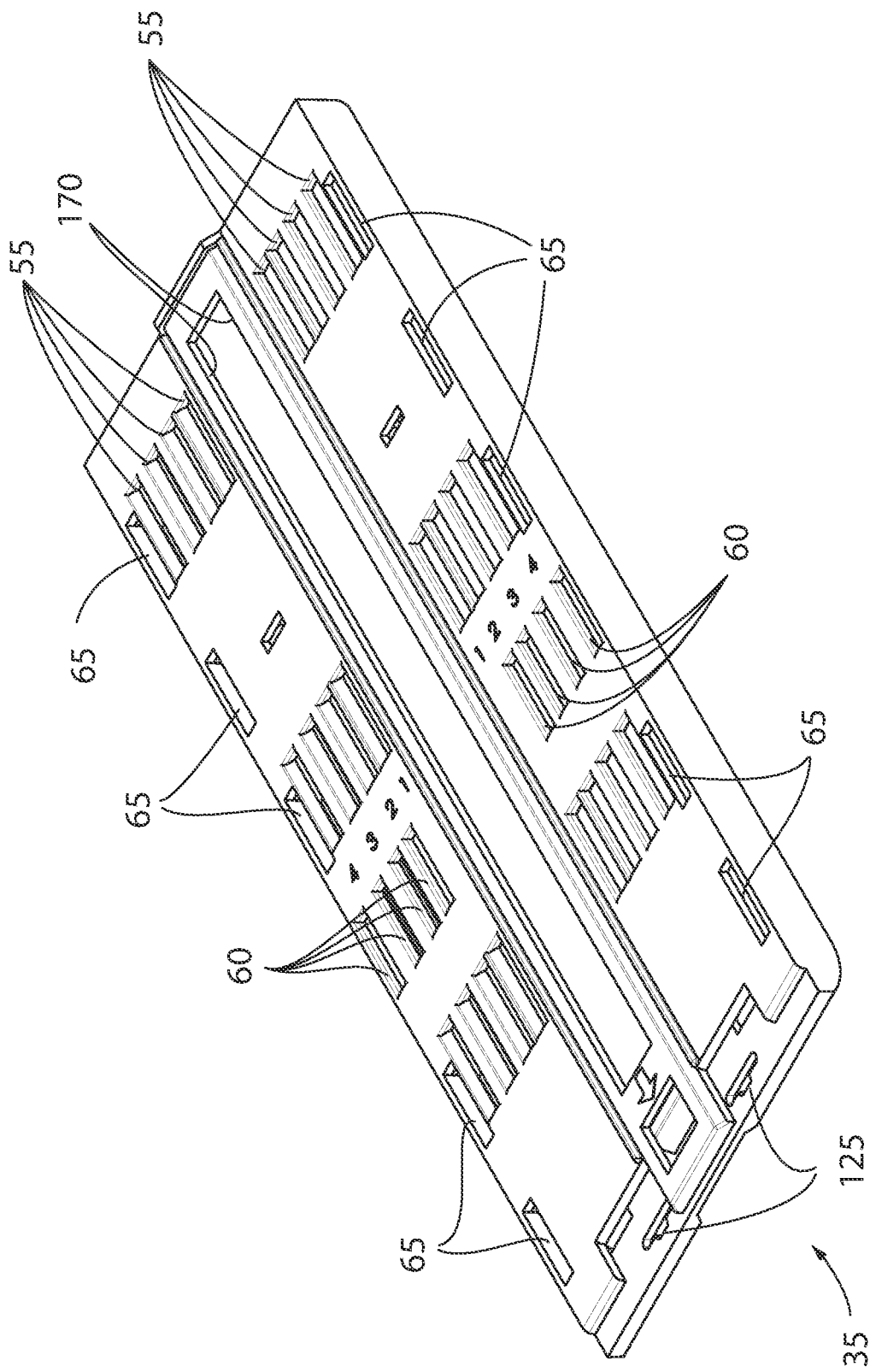
FIG. 4 is an isometric view of a tray of the product pusher apparatus of FIG. 1.
Figure 5:
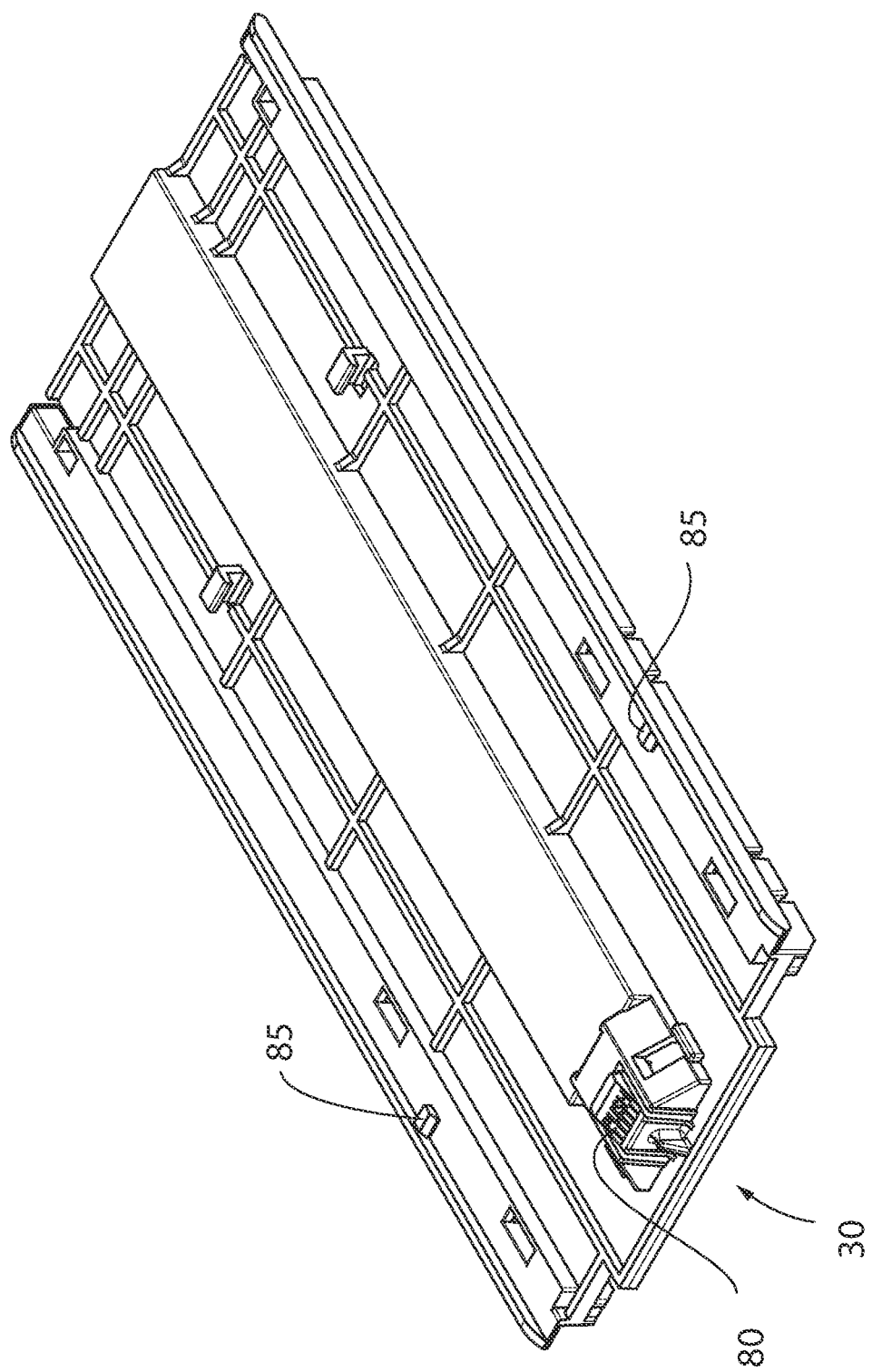
FIG. 5 is an isometric view of a slide plate of the product pusher apparatus of FIG. 1
Figure 6:
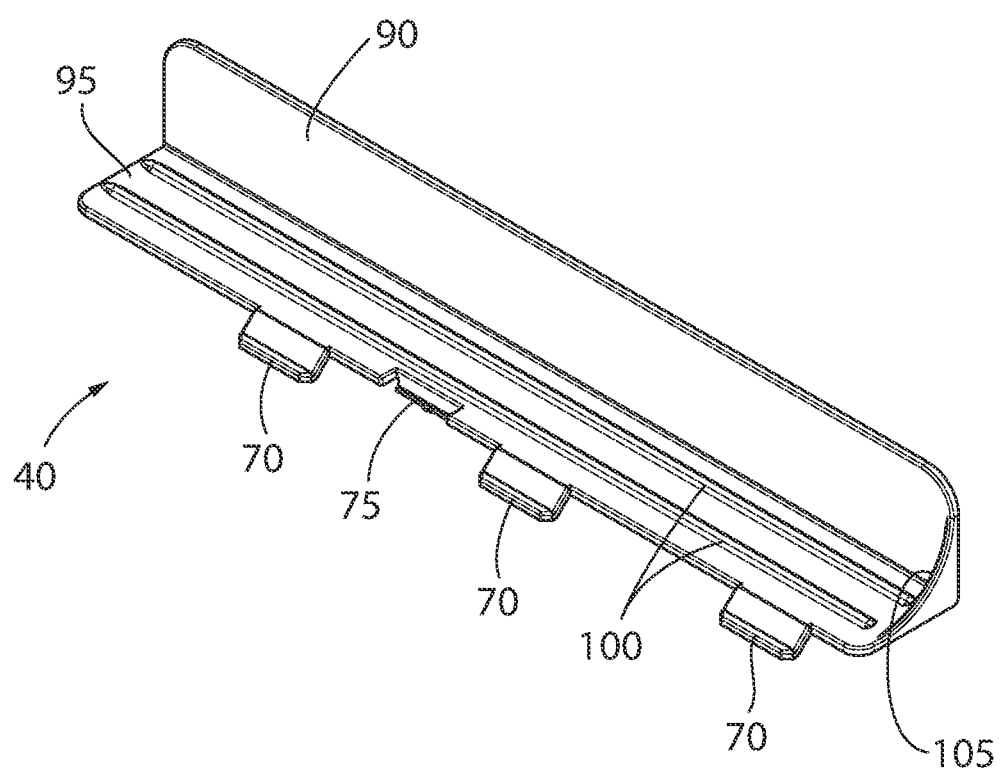
FIG. 6 is an isometric view of a first side partition of the product pusher apparatus of FIG. 1.

Moving to FIGS. 4-6, The base section 35 includes a first plurality of slots 55, a second plurality of slots 60, a third plurality of slots 65, and a plurality of indicia 1-4. The first plurality of slots 55 receive a first plurality of tabs 70 (or guides) of the first or second wall sections 40 or 45. The second plurality of slots 60 receive a first latch 75 of the first or second wall sections 40 or 45. The first plurality of slots 55 and the first plurality of tabs 70 define a placement of the first or second wall sections 40 or 45 with respect to the base section 35, and the second plurality of slots 60 and the first latch 75 fix the first or second wall sections 40 or 45 with respect to the base section 35. The indicia 1-4 (see, e.g., FIG. 3) help a user identify a setting for the product channel 25. A width for the product channel is set based on the location of the first and second wall sections 40 and 45 with respect to the base section 35. Of course, one skilled in the art can use different fastening techniques for defining a placement of the first and second wall sections 40 and 45 with respect to the base section 35.

The base section 35 is slideable with respect to the base component 30 when a user depresses push button 80. A first plurality of tabs 85 protrude at least partially through the third plurality of slots 65 when a pair of the third plurality of slots 65 are over the first plurality of tabs 85. The sliding of the base section 35 with respect to the base component 30 allows the user to move the tray component 15 in a more accessible position for placing product within the product channel 25. For example, the base component 30 can be fixed to a shelf (not shown), and a user can pull the base section 35 forward upon the push button 80 being pressed by the user, thereby allowing easier stocking of the product display apparatus 10. It is envisioned that the base component is unnecessary for some product display apparatus 10.

FIG. 6 shows the first wall section 40 having the first plurality of tabs 70 and the first latch 75. The first wall section 40 includes a first inside wall surface 90 and an inside bottom surface 95 to help retain product. The inside bottom surface 95 includes ribs 100 for supporting the product. The product can sit and slide on the ribs 100, while the ribs 100 provide space for miscellaneous debris to deposit. The first wall section 40 also includes a back stop 105 for defining a maximum channel length. The second wall section 45 of the product display apparatus is similar to the first wall section 40 but is the mirror image.

Figure 7:
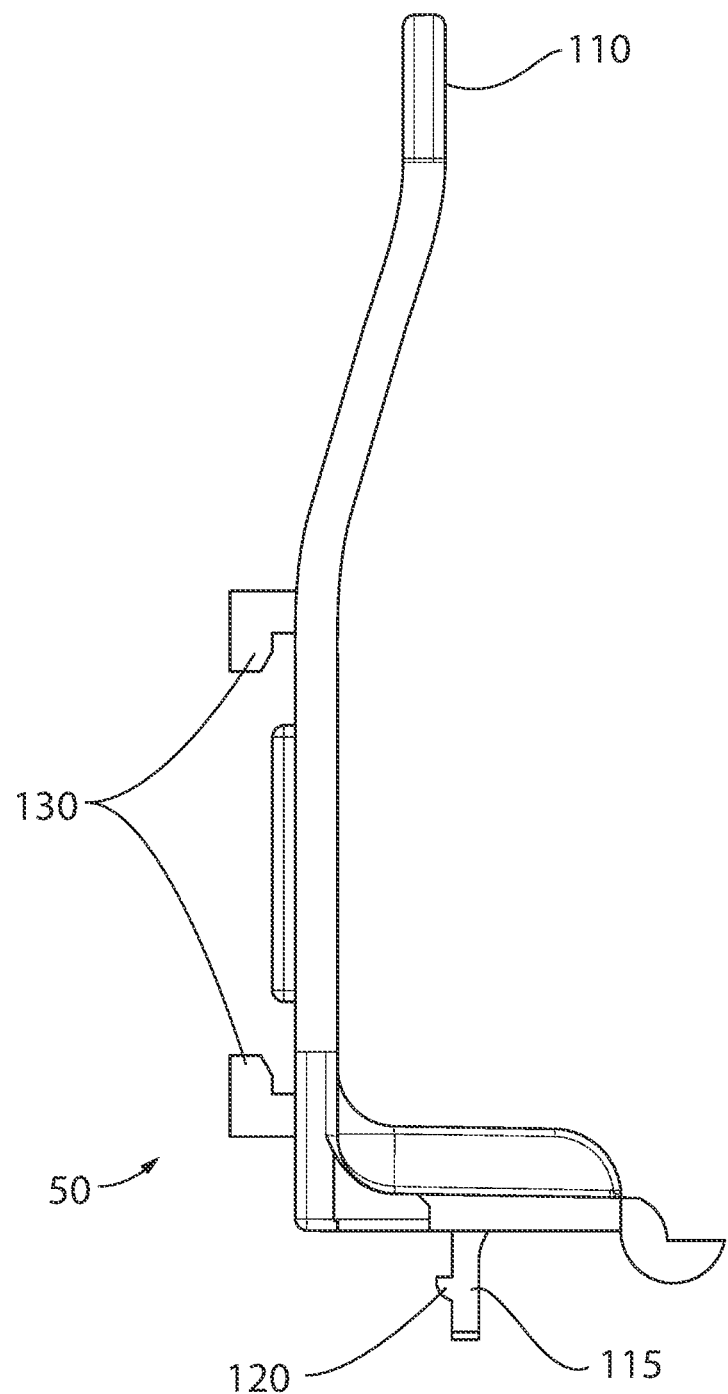
FIG. 7 is a side view of a front stop of the product pusher apparatus of FIG. 1.

FIG. 7 shows the front stop 50. Product pushes against a second inside wall surface 110 when the bearing pusher assembly 20 applies a force to the product. The front stop 50 includes a second plurality of tabs (tab 115 is shown in FIG. 7) having a respective latch (second latch 120 is shown in FIG. 7) for guiding and securing the front stop 50 in a fourth plurality of slots 125 (FIG. 4) of the base section 35. The front stop 50 can also include a plurality of holders 130 for holding signage.

The product display apparatus 10 includes the bearing pusher assembly 20 as shown in FIGS. 1-3. A spring 145 couples the bearing pusher assembly 20 to the tray component 15. The bearing pusher assembly 20 is shown in more detail in FIGS. 8-10. The bearing pusher assembly 20 includes a pusher body 135, an axle 140, and a ball bearing (discussed below).

Figure 8:
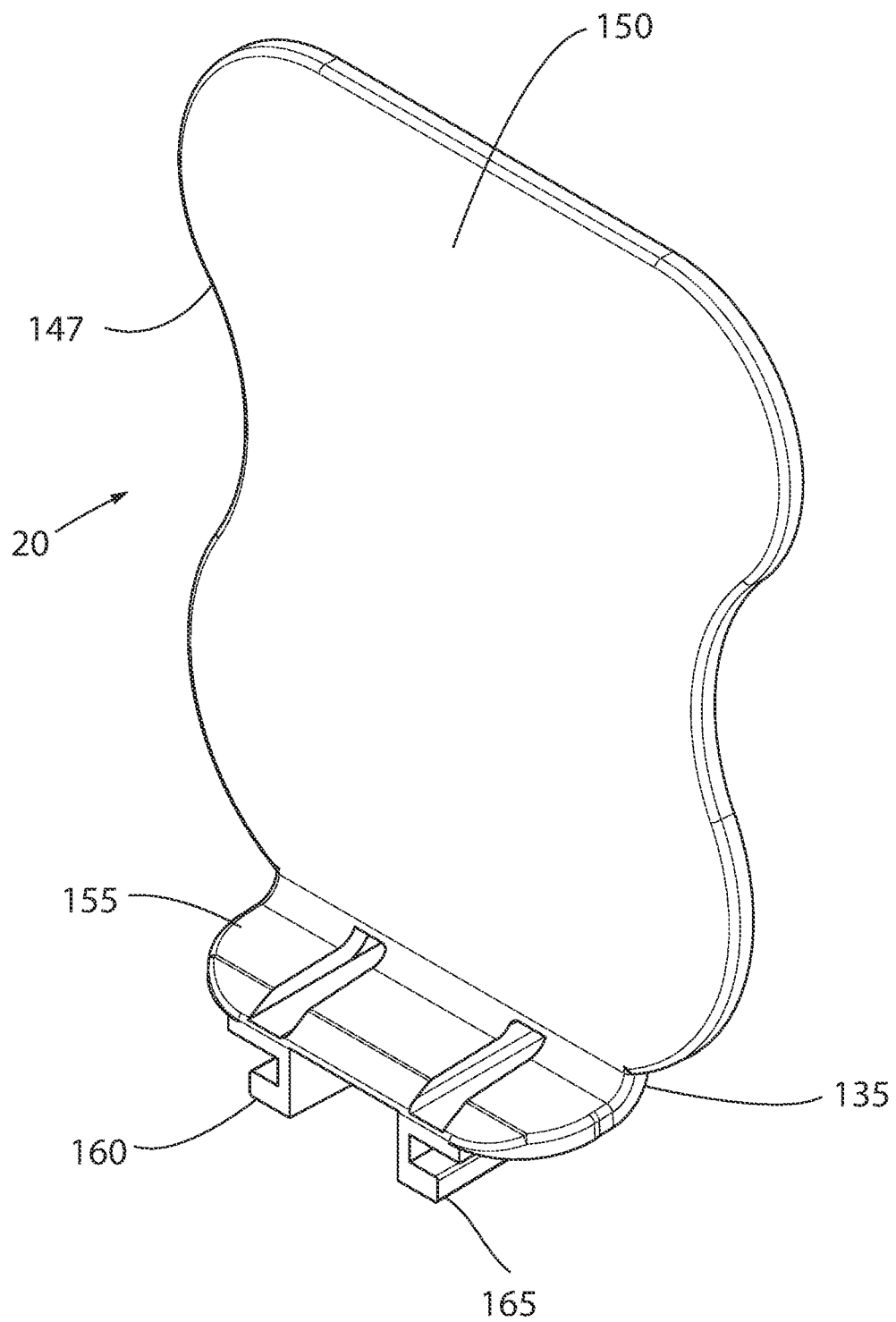
FIG. 8 is an isometric view of a bearing pusher assembly of the product pusher apparatus of FIG. 1.
Figure 9:
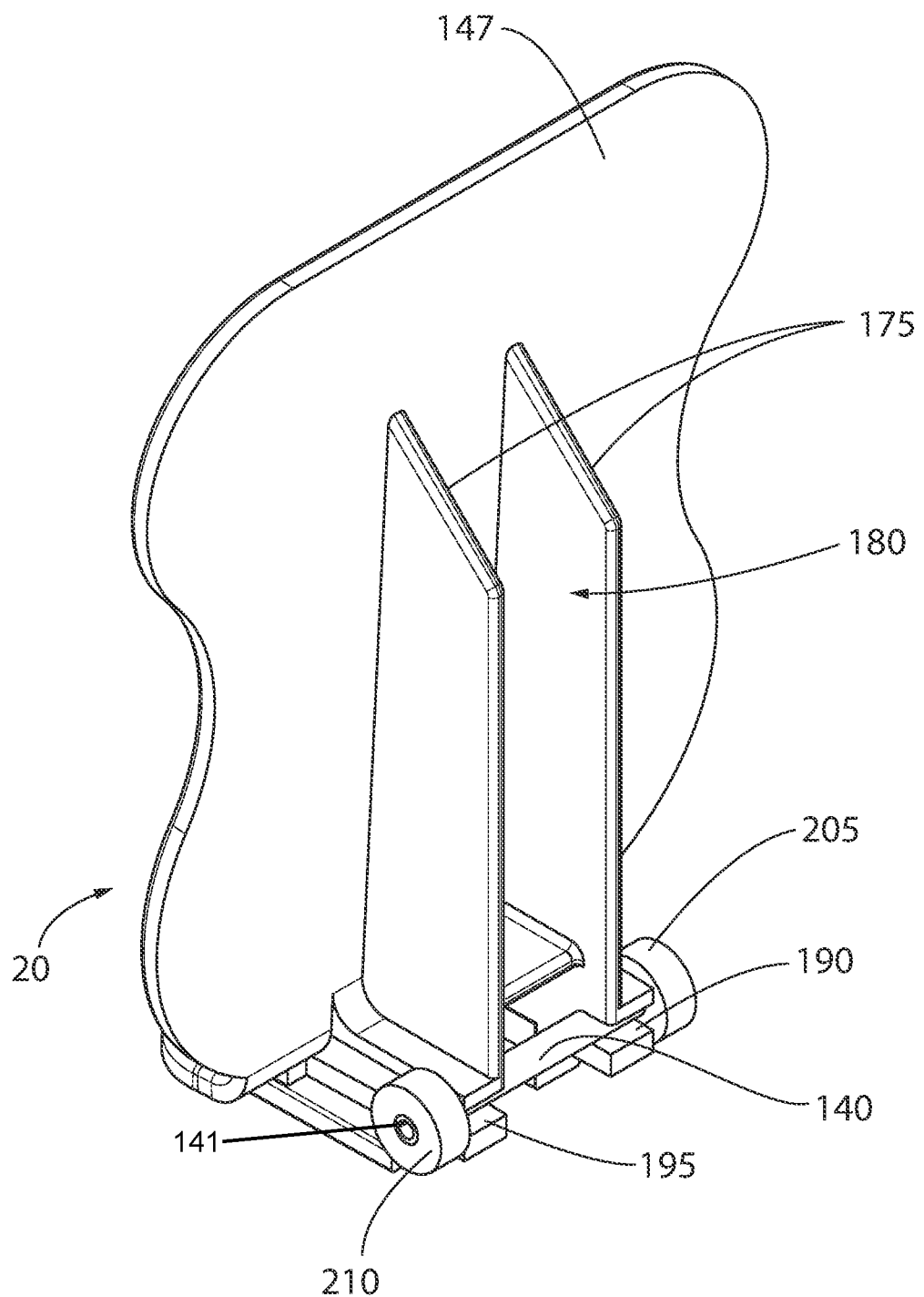
FIG. 9 is a reverse isometric view of the bearing pusher assembly of FIG. 8.
Figure 10:
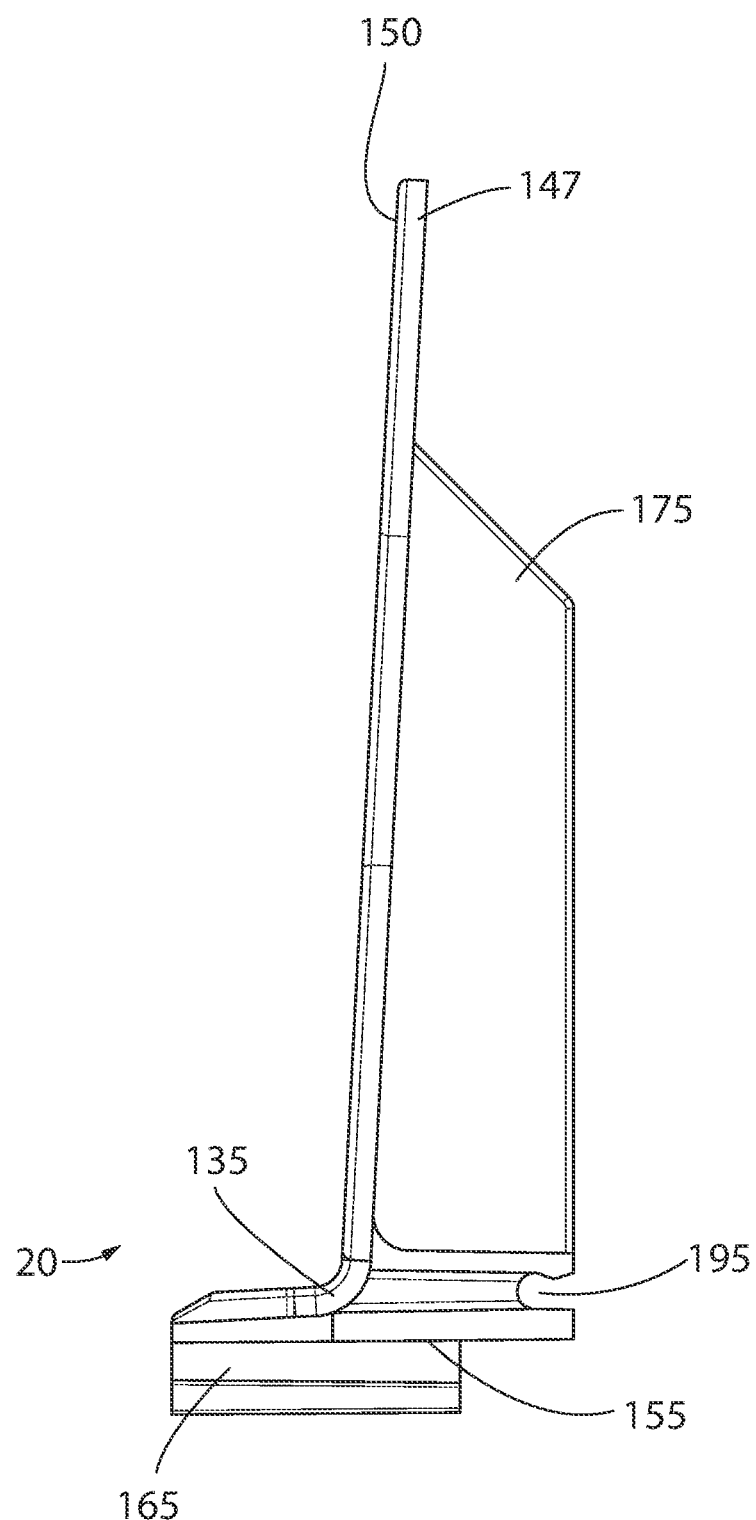
FIG. 10 is a side view of the bearing pusher assembly of FIG. 8 without an installed axle and ball bearings.

With reference to FIGS. 8-10, the pusher body 135 includes a wall 147 having a third inside wall surface 150. As product is placed in the product channel 25 by a user, the product pushes on the third inside wall surface 150 resulting in the spring 145 deforming. The more product placed within the product channel 25, the more the spring 145 is deformed. After the user fills the product channel 25 to his/her satisfaction, the spring 145 provides a resilience force with the bearing pusher assembly 20, and specifically the second inside wall surface 150, on the product. The product in turn pushes on the tray component 15, and specifically the first inside wall surface 90 of the front stop 50. The inside wall surfaces of the front stop 50, the first and second wall sections 40 and 45, and the pusher body 135, and the inside bottom surface 95 partially define a volume for the product channel 25.

The pusher body 135 includes a first guide portion 155 molded with the wall 147. The first guide portion 155 include first and second projections 160 and 165, respectively, which slideably interconnect with track 170 (FIG. 4). The track 170 acts as a second guide portion. The first and second projections 160 and 165 and the track 170 help guide the bearing pusher assembly 20 forward and backward with respect to the front stop 50. The pusher body 135 also includes fins 175 molded to the wall 147. The fins 175 define a chamber 180 for the spring 145.

Figure 12:
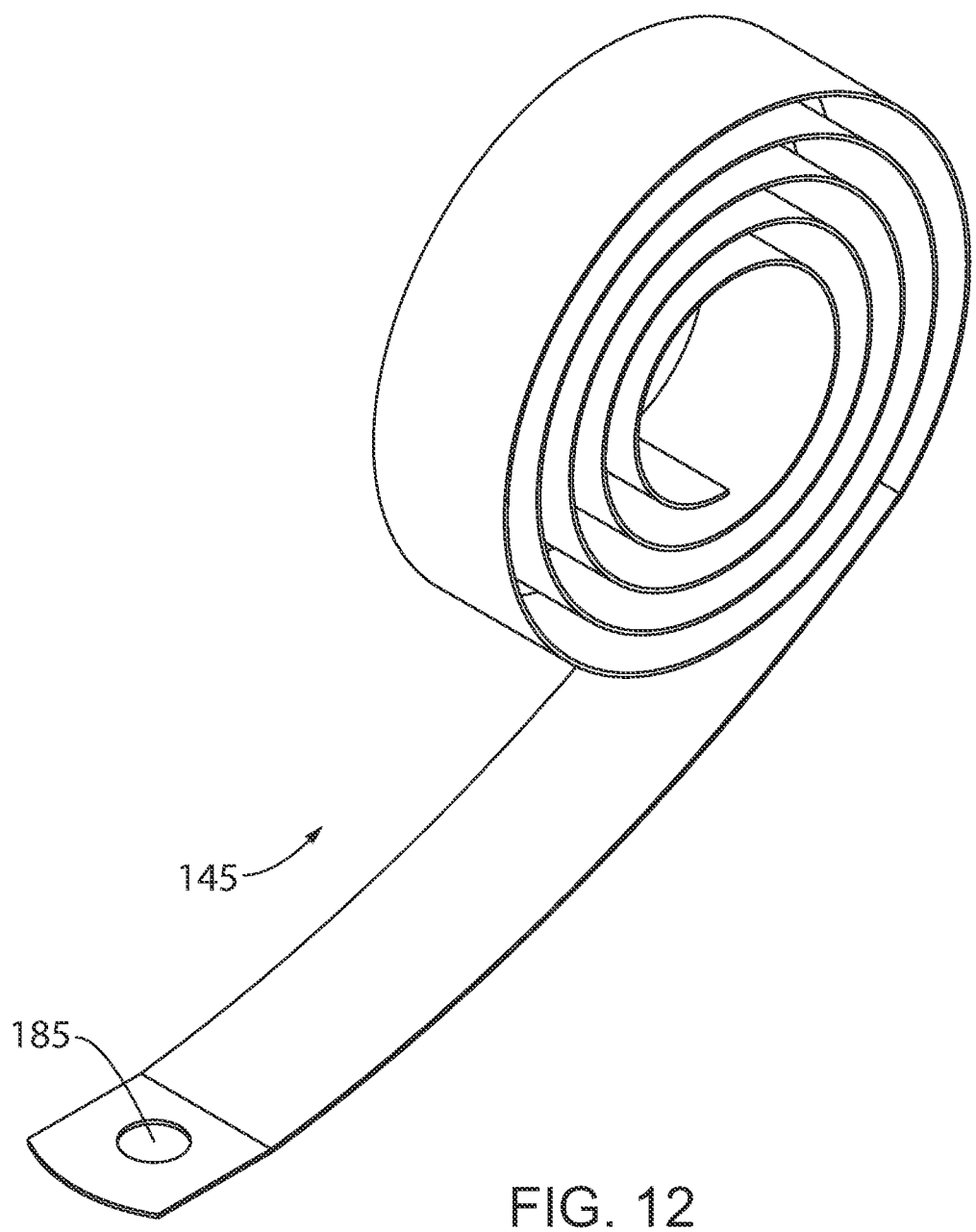
FIG. 12 is an isometric view of a spiral spring of the product pusher apparatus of FIG. 1.

With reference to FIGS. 1 and 12, the spring 145 is placed in the chamber 180 and the fins 175 frictionally hold the spring 145 in place. The shown spring 145 is a spiral wound spring with an aperture 185 at an end of the spring 145. The aperture 185 is used with a fastener (e.g., a molded pin (not shown)) to secure the spring to the base section 35. As the spring 145 deforms, a force is applied to the wall 147, product with the product channel 25, and the front stop 50. It is envisioned that the spring 145 can be of another type, such as a coil spring or elastic band.

Referring again to FIGS. 8-10, the pusher body 135 also includes first and second axle supports 190 and 195 (FIG. 10), respectively, molded in pusher body 135, The first and second axle supports 190 and 195 hold the axle 140. The axle 140 can be a spring pin having a slot 141 and is fixed with respect to the pusher body 135. It is also envisioned that the axle 140 can also be molded with the pusher body 135, or be a rolled pin or steel rod.

Figure 11:
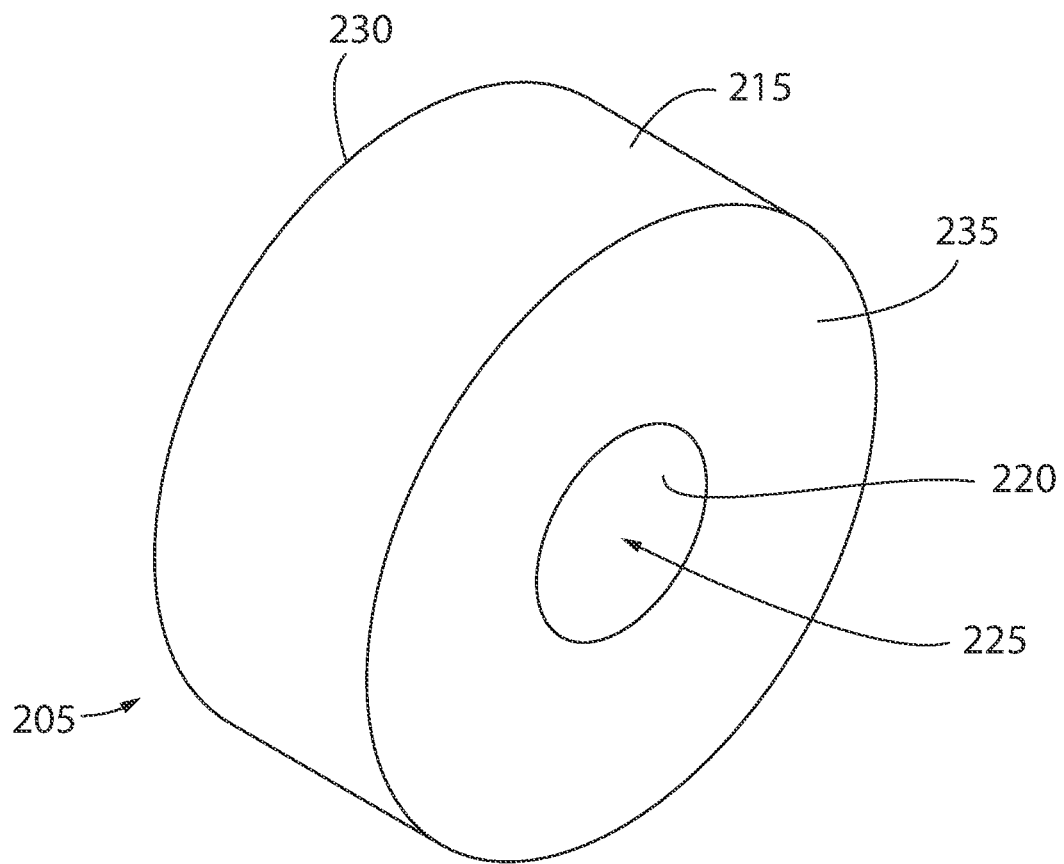
FIG. 11 is an isometric view of an enclosed ball bearing of the bearing pusher assembly of FIG. 8.

FIG. 9 shows first and second ball bearings 205 and 210, respectively, coupled to the axle 140. The first and second ball bearings 205 and 210 are an enclosed steel ball bearing. Enclosing the first and second ball bearings 205 and 210 prevent contaminants from entering the ball bearings and thereby preventing breakdown from contaminants. However, it is envisioned that the ball bearing may be opened or unsealed. The first ball bearing 205 is shown in more detail in FIG. 11. The first ball bearing 205 includes an outer cylindrical surface 215, an inner cylindrical surface 220, a chamber 225 defined by the inner cylindrical surface, and first and second sidewalls 230 and 235, respectively. The first and second ball bearings 205 and 210 are fixed to the axle 140 when the first and second ball bearings 205 and 210 are placed on the spring pin axle 140. More specifically, the spring pin axle 140 is placed within the chambers 225 of the first and second ball bearings 205 and 210, providing a fixed friction fit.

The first and second ball bearings 205 and 210 are self-rotating and do not require a rotating axle. More specifically, the first and second ball bearings 205 and 210 provide rotatable moveable coupling between the bearing pusher assembly 20 and the tray component 15. More specifically, the first and second ball bearings 205 and 210 provide rotational movement between the axle 140 and first and second paths 240 and 245 (FIG. 2), respectively.

There are virtually innumerable uses for the present invention, all of which need not be detailed here. Additionally, all the disclosed embodiments can be practiced without undue experimentation. Further, although the best mode contemplated by the inventors of carrying out the present invention is disclosed above, practice of the present invention is not limited thereto. It will be manifest that various additions, modifications, and rearrangements of the features of the present invention may be made without deviating from the spirit and scope of the underlying inventive concept.

In addition, the individual components of the present invention discussed herein need not be fabricated from the disclosed materials but could be fabricated from virtually any suitable materials. Moreover, the individual components need not be formed in the disclosed shapes, or assembled in the disclosed configuration, but could be provided in virtually any shape, and assembled in virtually any configuration. Furthermore, all the disclosed features of each disclosed embodiment can be combined with, or substituted for, the disclosed features of every other disclosed embodiment except where such features are mutually exclusive.

It is intended that the appended claims cover all such additions, modifications, and rearrangements. Expedient embodiments of the present invention are differentiated by the appended claims.

What is claimed is:

1. A ball bearing pusher assembly for moving product in a channel of a product display apparatus having a tray component and a spring, the ball bearing pusher assembly to be coupled with the spring and moveable with respect to the tray component, the spring to provide a resilience force to the tray component and the ball bearing pusher assembly upon deformation, the ball bearing pusher assembly comprising:
   a pusher body;
   a fixed spring pin coupled to the pusher body, wherein the fixed spring pin is a slotted spring pin; and
   a sealed ball bearing having an outer cylindrical surface and an inner cylindrical surface fixedly coupled to the fixed spring pin, wherein the sealed ball bearing provides rotational movement between the fixed spring pin and along a path of the tray component; and
   a first projection and a second projection, wherein each of the first projection and the second projection is located separately from the sealed ball bearing, wherein each of the first projection and the second projection is configured to receive a track of the tray component.

2. The ball bearing pusher assembly of claim 1, wherein the pusher body includes a first pin support and a second pin support, and wherein the fixed spring pin is fixedly coupled to the first pin support and the second pin support.

3. The ball bearing pusher assembly of claim 1, wherein the ball bearing pusher assembly includes a second sealed ball bearing having an inner cylindrical surface fixedly coupled to the fixed spring pin and an outer cylindrical surface rotatably moveable with respect to the fixed spring pin and along a second path of the tray component.

4. The ball bearing pusher assembly of claim 1, wherein least one projection and the track guide movement of the ball bearing pusher assembly with respect to the tray component upon deformation and resilience of the spring.

5. A product display apparatus for placement on a shelf, the product display apparatus comprising:
   a substantially stationary base component;
   a tray component moveably coupled to the base component, the tray component including a base section, a front wall, a first side wall, and a second side wall, the base section having a track, wherein the substantially stationary base component is located between the shelf and the tray component;
   a ball bearing pusher assembly movably coupled to the base section, the ball bearing pusher assembly, the base section, the front wall, the first side wall, and the second side wall defining a product channel, the ball bearing pusher assembly including
      a pusher body having a first pin support, a second pin support, a first projection, and a second projection, wherein each of the first projection and the second projection moveably retain the track,
      a spring pin fixedly coupled to the first pin support and the second pin support, wherein the spring pin is a slotted spring pin,
      a first sealed steel ball bearing having a first outer cylindrical sura first inner cylindrical surface fixedly coupled to the slotted spring pin, wherein the first sealed ball bearing provides rotational movement between the slotted spring pin along a first path of the base section, and
      a second sealed steel ball bearing having a second outer cylindrical surface and a second inner cylindrical surface fixedly coupled to the slotted spring pin, wherein the second sealed ball bearing provides rotational movement between the slotted spring pin and along a second path of the base section; and
   a spiral spring coupling the tray component and the ball bearing pusher assembly, the spiral spring providing a resilience force to the tray component and the ball bearing pusher assembly upon deformation.

6. The product display apparatus of claim 5, wherein the base section has a first slot, a second slot, a third slot, and a fourth slot,
   wherein the first wall has a first tab interconnected with one of the first slot and the second slot,
   wherein the second wall has a second tab interconnected with one of the third slot and the fourth slot, and
   wherein a volume of a product support channel changes depending on the first tab being interconnected with the first slot or the second slot and the second tab being interconnected with the third slot or the fourth slot.

7. A ball bearing pusher assembly for moving product in a channel of a product display apparatus having a tray component and a spring, the ball bearing pusher assembly to be coupled with the spring and moveable with respect to the tray component, the spring to provide a resilience force to the tray component and the ball bearing pusher assembly upon deformation, and the tray component to include a track, ball bearing pusher assembly comprising:
- a pusher body including a first pin support and a second pin support;
- a slotted spring pin fixedly coupled to the first pin support and the second pin support;
- a first sealed ball bearing having a first outer cylindrical surface and a first inner cylindrical surface fixedly coupled to the slotted spring pin, wherein the first sealed ball bearing provides rotational movement between the slotted spring pin and along a path of the tray component;
- a second sealed ball bearing having a second outer cylindrical surface and a second inner cylindrical surface fixedly coupled to the fixed spring pin, wherein the second sealed ball bearing provides rotational movement between the slotted spring pin and along a second path of the tray component; and
- a first projection and a second projection, wherein each of the first projection and the second projection is configured to movably receive the track, wherein the first projection, the second projection, and the track guide movement of the ball bearing pusher assembly with respect to the tray component upon deformation and resilience of the spring, wherein each of the first projection and the second projection is located separately from the first sealed ball bearing and the second sealed ball bearing.

8. The ball bearing pusher assembly of claim 1, wherein the product display apparatus is placed on a shelf and further includes a base component slideably coupled to the tray component.

9. The ball bearing pusher assembly of claim 1, wherein an end of the spring is secured to a section of the tray component.

10. The ball bearing pusher assembly of claim 1, further comprising:
- a first pin support and a second pin support within the pusher body, the fixed spring pin coupled to the first pin support and the second pin support;
- a second sealed ball bearing having an inner cylindrical surface fixedly coupled to the fixed spring pin and an outer cylindrical surface rotatably moveable with respect to the fixed spring pin and along the path of the tray component;
- wherein the ball bearing pusher assembly is combined with the product display apparatus;
- wherein the tray component includes a first wall with a first tab interconnected with a first slot and a second slot, a second wall having a second tab interconnected with one of a third slot and a fourth slot, a volume of a product support channel that changes depending on the first tab being interconnected with the first slot or the second slot and the second tab being interconnected with the third slot or the fourth slot, a front wall connected to the first wall and second wall, a plurality of signage holders included the front wall, a back stop configured to define a maximum channel length between the back stop of the first wall and the front wall, and indicia disposed on the tray component configured to assist a user in setting the volume of the product support channel; and
- wherein the product display apparatus further includes a base component slideably coupled to the tray component and secured to a shelf and a push button to release the tray component and make it slideable with respect to the base component, the fixed spring having an end secured to the base component.

11. The product display apparatus of claim 5, wherein the base section of the tray component is slideable with respect to the base component upon depression of a push button.

12. The product display apparatus of claim 5, wherein an end of the spiral spring is secured to the base component.

13. The product display apparatus of claim 5, wherein the pusher assembly includes the first projection and the second projection, the first projection and the second projection configured to receive the track of the base section of the tray component.

14. The product display apparatus of claim 5, wherein the front wall includes a plurality of signage holders.

15. The product display apparatus of claim 5, wherein a first wall section includes a back stop configured to define a maximum channel length between the back stop of the first wall section and the front wall.

16. The product display apparatus of claim 5, wherein a second wall section includes a back stop configured to define a maximum channel length between the back stop of the second wall section and the front wall.

17. The product display apparatus of claim 6, further comprising indicia disposed on the base section of the tray component configured to assist a user in setting the volume of the product support channel.

18. The ball bearing pusher assembly of claim 7, wherein the product display further includes a base component slideably coupled to the tray component, the base component secured to a shelf.

19. The bail bearing pusher assembly of claim 7, wherein an end of the spring is secured to the base component.

* * * * *